(12) United States Patent
Zähe et al.

(10) Patent No.: US 11,988,185 B2
(45) Date of Patent: May 21, 2024

(54) VALVE WITH AN INTEGRATED TURBINE FOR ENERGY HARVESTING

(71) Applicant: Sun Hydraulics, LLC, Sarasota, FL (US)

(72) Inventors: Bernd Zähe, Sarasota, FL (US); Steven J. Meislahn, Sarasota, FL (US); Hailee Morgan, Sarasota, FL (US)

(73) Assignee: Sun Hydraulics, LLC, Sarasota, FL (US)

( * ) Notice: Subject to any disclaimer, the term of this patent is extended or adjusted under 35 U.S.C. 154(b) by 131 days.

(21) Appl. No.: 17/739,293

(22) Filed: May 9, 2022

(65) Prior Publication Data
US 2022/0397089 A1 Dec. 15, 2022

Related U.S. Application Data

(60) Provisional application No. 63/209,441, filed on Jun. 11, 2021.

(51) Int. Cl.
*F03B 13/00* (2006.01)
*F15B 1/26* (2006.01)
(Continued)

(52) U.S. Cl.
CPC ............ *F03B 13/00* (2013.01); *F15B 13/02* (2013.01); *F15B 13/026* (2013.01); *F15B 15/00* (2013.01);
(Continued)

(58) Field of Classification Search
CPC ........ F03B 13/00; F03B 17/061; F15B 13/02; F15B 13/026; F15B 15/00; F15B 21/14;
(Continued)

(56) References Cited

U.S. PATENT DOCUMENTS 3,701,277 A 10/1972 McMahon et al.
4,566,317 A 1/1986 Shakra
(Continued)

FOREIGN PATENT DOCUMENTS

CN 101379330 B 9/2012
CN 106 089 548 A 11/2016
(Continued)

OTHER PUBLICATIONS

International Search Report and Written Opinion prepared by the European Patent Office in International application No. PCT/US2022/032611 dated Sep. 29, 2022.

*Primary Examiner* — Joseph Ortega
(74) *Attorney, Agent, or Firm* — McDonnell Boehnen Hulbert & Berghoff LLP

(57) ABSTRACT

An example valve includes: a seat member; a spool configured to be seated on the seat member to block fluid flow from a first port to a second port when the valve is in a closed state, wherein fluid at the first port applies a fluid force on the spool; a spring applying a biasing force on the spool toward the seat member, wherein as the fluid force overcomes the biasing force, the spool moves in the proximal direction off the seat member, thereby allowing fluid flow from the first port to the second port through a flow area formed between the spool and the seat member; a turbine configured to rotate as fluid flowing through the flow area flows downstream across the turbine; and an electric generator coupled to the turbine, such that rotation of the turbine causes the electric generator to generate electric power.

19 Claims, 6 Drawing Sheets

(51) Int. Cl.
  *F15B 13/02* (2006.01)
  *F15B 15/00* (2006.01)
  *F15B 21/14* (2006.01)
  *F16K 11/07* (2006.01)
  *F16K 17/04* (2006.01)
  *F16K 37/00* (2006.01)
  *G01F 1/115* (2006.01)
  *G01F 15/00* (2006.01)
  *G01F 15/06* (2022.01)
  *H02K 7/18* (2006.01)

(52) U.S. Cl.
  CPC .............. *F15B 21/14* (2013.01); *F16K 11/07* (2013.01); *F16K 17/048* (2013.01); *F16K 37/005* (2013.01); *G01F 1/115* (2013.01); *G01F 1/1155* (2013.01); *G01F 15/005* (2013.01); *G01F 15/066* (2013.01); *H02K 7/1823* (2013.01); *F05B 2220/706* (2013.01)

(58) Field of Classification Search
  CPC .. F15B 2211/40584; F15B 2211/40592; F15B 2211/41554; F15B 2211/428; F15B 2211/50518; F15B 2211/50563; F15B 2211/5156; F15B 13/0405; F15B 13/042; F16K 11/07; F16K 17/048; F16K 37/005; F16K 51/00; F16K 47/08; G01F 1/115; G01F 1/1155; G01F 15/005; G01F 15/066; H02K 7/1823; F05B 2220/706
  See application file for complete search history.

(56) References Cited

U.S. PATENT DOCUMENTS

| | | | |
|---|---|---|---|
| 6,789,434 | B2 | 9/2004 | Peterson |
| 7,624,632 | B1 | 12/2009 | Hoyle et al. |
| 2012/0325016 | A1 | 12/2012 | Peled |
| 2014/0346776 | A1* | 11/2014 | Park ........................ F01D 15/10 290/52 |
| 2021/0116044 | A1 | 4/2021 | Zaehe et al. |
| 2021/0310838 | A1 | 10/2021 | Dietel |

FOREIGN PATENT DOCUMENTS

| | | |
|---|---|---|
| DE | 199 54 964 A1 | 5/2001 |
| WO | 2006/053878 A2 | 5/2006 |

* cited by examiner

VALVE WITH AN INTEGRATED TURBINE FOR ENERGY HARVESTING

CROSS REFERENCE TO RELATED APPLICATION

The present application claims priority to U.S. Provisional patent application Ser. No. 63/209,441, filed on Jun. 11, 2021, and entitled "Pressure-Compensated Flow Control Valve with an Integrated Turbine for Energy Harvesting or Flow Rate Sensing," the entire contents of which are herein incorporated by reference as if fully set forth in this description.

BACKGROUND

A hydraulic valve directs the flow of a liquid medium, usually oil, through a hydraulic system. The direction of the oil flow is determined by the position of a movable element such as a spool, piston, or poppet. The size of the valve may be determined by the maximum flow of the hydraulic system through the valve and the maximum system pressure.

The movable element of the valve may be disposed within a housing or sleeve, and the movable element can be movable by fluid force. As the spool moves, a flow area or an orifice forms and allows fluid flow from a first port to a second port.

Whenever fluid flows through an orifice at a particular flow rate causing a pressure drop across the orifice, power is lost in the form of heat generated as fluid flows through the valve. The power loss can amount to the fluid flow rate multiplied by the pressure differential across the orifice. It may thus be desirable to harvest, at least a portion of, such power loss to render the system more efficient. It is with respect to these and other considerations that the disclosure made herein is presented.

SUMMARY

The present disclosure describes implementations that relate to a valve with an integrated turbine for energy harvesting.

In a first example implementation, the present disclosure describes a valve. The valve includes: a seat member; a spool configured to be seated on the seat member to block fluid flow from a first port to a second port when the valve is in a closed state, wherein fluid at the first port applies a fluid force on the spool in a proximal direction; a spring applying a biasing force on the spool in a distal direction toward the seat member, wherein as the fluid force overcomes the biasing force, the spool moves in the proximal direction off the seat member, thereby allowing fluid flow from the first port to the second port through a flow area formed between the spool and the seat member; a turbine configured to rotate as fluid flowing through the flow area flows downstream across the turbine, wherein the turbine is mounted to a turbine shaft configured to rotate with the turbine; and an electric generator coupled to the turbine shaft, such that rotation of the turbine shaft with the turbine causes the electric generator to generate electric power.

In a second example implementation, the present disclosure describes a system. The system includes: a hydraulic actuator having a first chamber and a second chamber; a source of fluid; a fluid reservoir; a directional control valve having an inlet port fluidly-coupled to the source of fluid, a first workport fluidly-coupled to the first chamber of the hydraulic actuator, a second workport fluidly-coupled to the second chamber of the hydraulic actuator, and a return port; and the valve of the first example implementation, wherein the first port of the valve is fluidly-coupled to the return port of the directional control valve and the second port of the valve is fluidly-coupled to the fluid reservoir.

In a third example implementation, the present disclosure describes a method. The method includes: operating a valve in a closed state, wherein a spool is seated on a seat member to block fluid flow from a first port to a second port, wherein fluid at the first port applies a fluid force on the spool in a proximal direction, and wherein a spring applies a biasing force on the spool in a distal direction toward the seat member; as the fluid force overcomes the biasing force, moving the spool in the proximal direction off the seat member to open a main flow path allowing fluid flow from the first port to the second port through a flow area formed between the spool and the seat member; causing fluid flowing through the main flow path to rotate a turbine coupled to an electric generator, such that rotation of the turbine causes the electric generator to generate electric power; and as pressure level of fluid at the first port increases, moving the spool farther in the proximal direction to open a bypass flow path allowing a portion of fluid to bypass the turbine and flow directly from the first port to the second port.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

DETAILED DESCRIPTION

In examples, a flow control valve can have a movable element such as a spool that blocks fluid flow from a first port to a second port until pressure level at the first port exceeds a threshold pressure. As the pressure level meets the threshold pressure, the spool can move to allow fluid flow from the first port to the second port.

In example disclosed valves, a turbine is integrated within the valve. The term "turbine" is used herein to indicate rotary mechanical device, such as an impeller, that extracts energy from a fluid flow. As fluid flows across the turbine, fluid rotates the turbine and converts it into kinetic energy that can be used to generate useful work.

In an example, the turbine is coupled to a shaft rotating within an electric generator. Thus, as the shaft rotates, electric power is generated by the electric generator. With this configuration, at least a portion of the hydraulic power, which would otherwise be lost in the form of heat as fluid flows across the valve, is harvested in the form of electric power. Such harvested electric power can be used in other parts of the hydraulic system to enhance its efficiency or provide electric power in parts of a machine that otherwise have no access to electric power.

Figure 1:
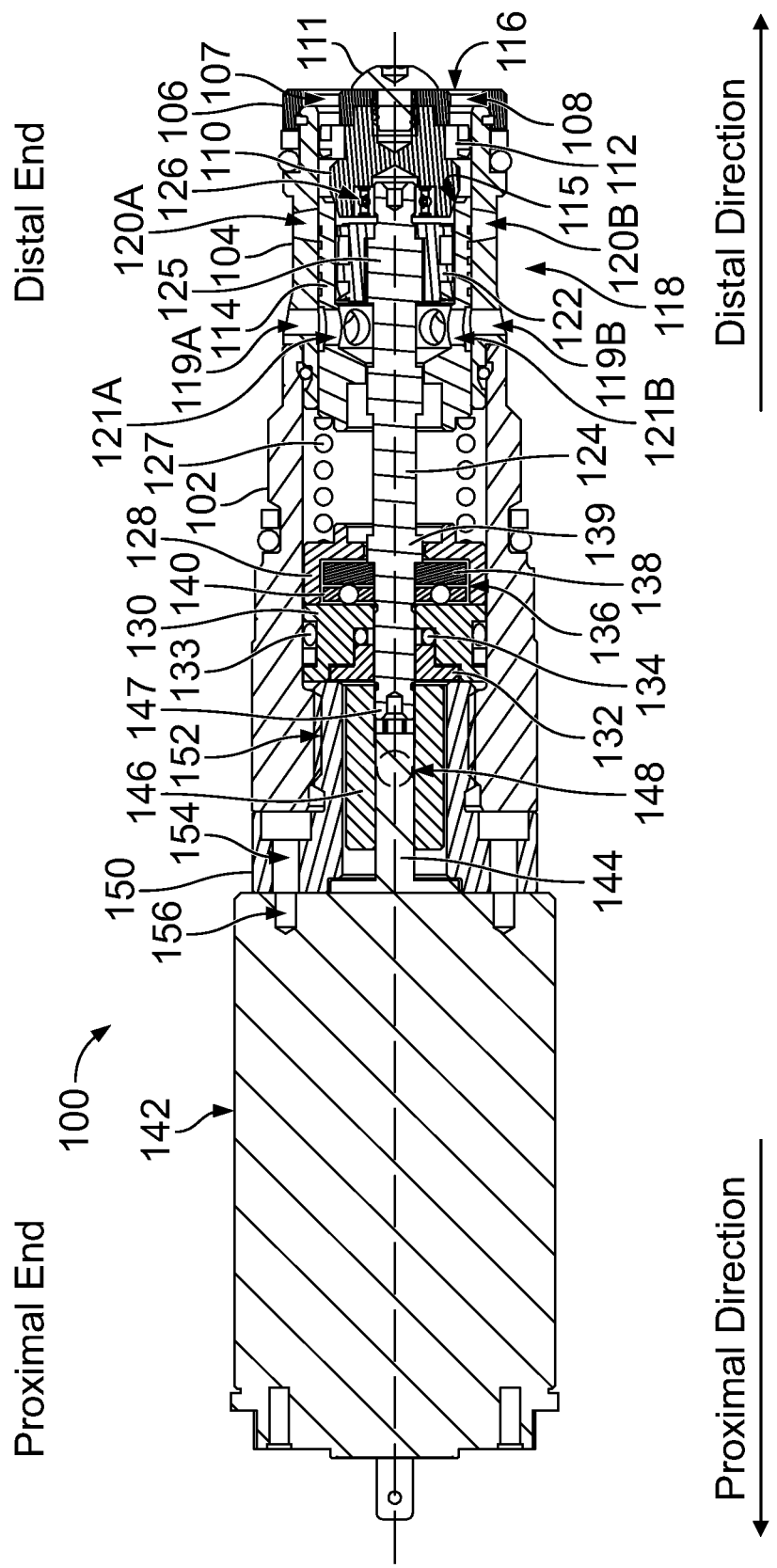
FIG. 1 illustrates a cross-sectional side view of a valve with an integrated turbine and electric generator for energy harvesting, in accordance with an example implementation.

FIG. 1 illustrates a cross-sectional side view of a valve 100 with an integrated turbine and electric generator for energy harvesting, in accordance with an example implementation. The valve 100 may be inserted or screwed into a manifold having ports corresponding to ports of the valve 100 described below, and the manifold can fluidly couple the valve 100 to other components of a hydraulic system.

The valve 100 includes a housing 102 having a longitudinal cylindrical cavity therein. The longitudinal cylindrical cavity of the housing 102 is configured to house components of the valve 100. The valve 100 further includes a sleeve 104 fixedly-disposed partially within the longitudinal cylindrical cavity of the housing 102. The sleeve 104 has a respective longitudinal cylindrical cavity therein.

The valve 100 includes a nose piece 106 coupled to the sleeve 104 and disposed at a distal end of the sleeve 104. The nose piece 106 has a plurality of through-holes, such as through-hole 107 and through-hole 108, disposed in a circular array about a distal end of the nose piece 106. The valve 100 also includes a seat member 110 coupled to the nose piece 106 via a screw 111.

The valve further includes a stator 112 that is annular and disposed radially between the seat member 110 and the sleeve 104. In an example, the stator 112 includes blades or fins used to direct and spin the flow of fluid to enhance efficiency of energy harvesting as described below.

The valve 100 also includes a spool 114 disposed within the longitudinal cylindrical cavity of the sleeve 104. The spool 114 can also be referred to as a piston or poppet. The spool 114 is slidably-accommodated within the sleeve 104 such that the exterior surface of the spool 114 slides against the interior surface of the sleeve 104. As such, the spool 114 is axially-movable within the sleeve 104. The term "slidably accommodated" is used throughout herein to indicate that a first component (e.g., the spool 114) is not stationary, locked, or fixedly-disposed in the valve 100, but is rather allowed to move relative to a second component (e.g., the sleeve 104).

Further, the seat member 110 operates as a seat for the spool 114. Particularly, an interior surface of the spool 114 seats against the seat member 110 at a seat 115 when the valve 100 is in the closed state shown in FIG. 1.

The valve 100 includes a first port 116 at a distal end of the sleeve 104. The first port 116 includes, for example, the through-holes 107, 108 of the nose piece 106. The valve 100 further includes a second port 118. The second port 118 includes two sets of cross-holes, each set formed in a circumferential array about the sleeve 104. The first set of cross-holes can be referred to as main flow cross-holes and include, for example, main flow cross-hole 119A and main flow cross-hole 119B. The second set of cross-holes can be referred to as bypass flow cross-holes and include, for example, a bypass flow cross-hole 120A and a bypass flow cross-hole 120B. The first set of cross-holes (e.g., the main flow cross-holes 119A, 119B) and the second set of cross-holes (e.g., the bypass flow cross-holes 120A, 120B) are axially-spaced from each other along a length of the sleeve 104.

As shown in FIG. 1, the spool 114 has a plurality of spool cross-holes, such as spool cross-hole 121A and spool cross-hole 121B formed in a circumferential array about the spool 114. In the position shown in FIG. 1, the spool 114 blocks the bypass flow cross-holes 120A, 120B. However, in the position shown in FIG. 1, the main flow cross-holes 119A, 119B are fluidly-coupled to the spool cross-holes 121A, 121B of the spool 114.

The term "fluidly-coupled" is used throughout herein to indicate that fluid can flow or be communicated between two fluid passages, chambers, ports, or openings. The term "block" is used throughout herein to indicate substantially preventing fluid flow except for minimal or leakage flow of drops per minute, for example. The term "hole" is used generally herein to indicate a hollow place (e.g., cavity) in a solid body or surface, for example. The term "cross-hole" is used herein to encompass any type of opening (e.g., slot, window, hole, etc.) that crosses a path of, or is formed transverse relative to, another hole, cavity, or channel.

The valve 100 further includes a turbine 122 disposed within the spool 114 and mounted to a turbine shaft 124. The turbine 122 is mounted to the turbine shaft 124 such that as the turbine 122 rotates, the turbine shaft 124 rotates therewith.

Figure 2:
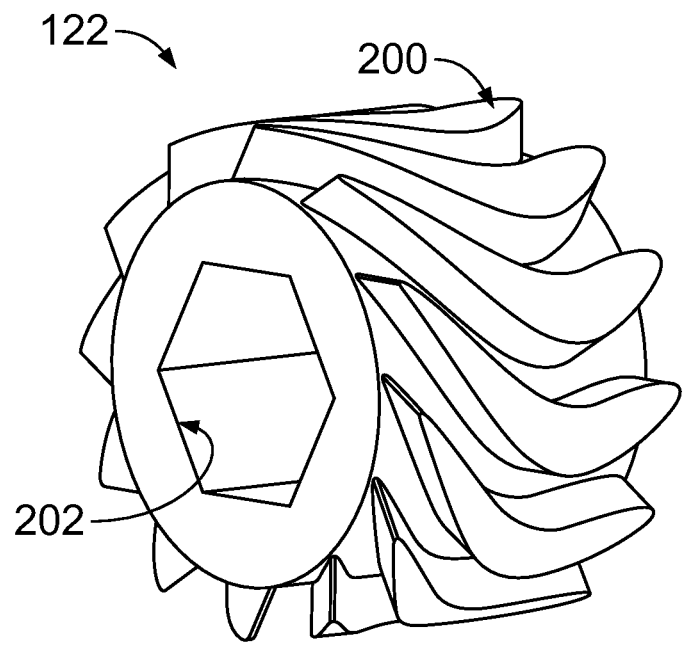
FIG. 2 illustrates a perspective view of a turbine, in accordance with an example implementation.
Figure 3:
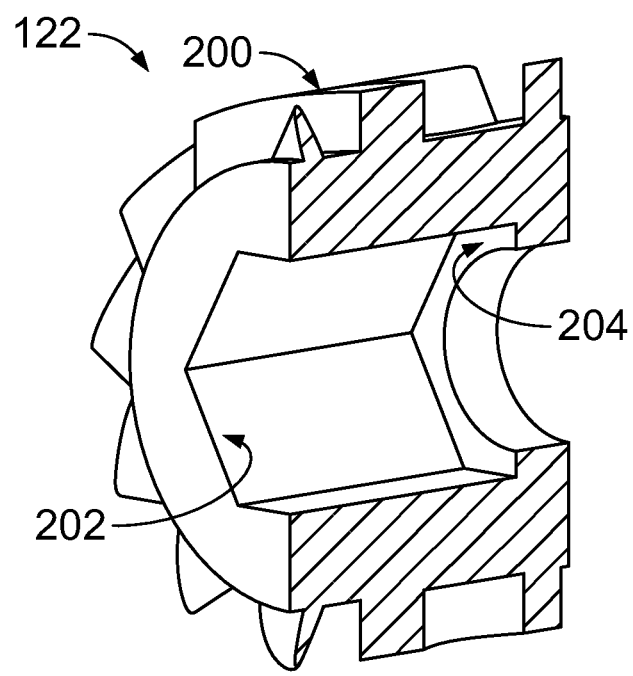
FIG. 3 illustrates a perspective cross-sectional view of the turbine of FIG. 2, in accordance with an example implementation.

FIG. 2 illustrates a perspective view of the turbine 122, and FIG. 3 illustrates a perspective cross-sectional view of the turbine 122, in accordance with an example implementation. The turbine 122 has a plurality of fins or blades 200 disposed about an exterior surfaces of the turbine 122. As fluid impacts the blades 200 with sufficient velocity, the turbine 122 rotates.

The turbine 122 is hollow to allow the turbine shaft 124 to be disposed therethrough. The turbine 122 has a hexagonal interior surface 202 and the turbine shaft 124 has a shaft portion 125 (see FIG. 1) having a corresponding hexagonal exterior surface to facilitate mounting the turbine 122. With is configuration, as the turbine 122, the turbine shaft 124 rotates therewith.

The turbine 122 further includes an internal flanged portion 204 against which the shaft portion 125 rests. This way, the turbine 122 is precluded from moving in the proximal direction.

Referring back to FIG. 1, a distal end of the turbine shaft 124 is received within the seat member 110 and is supported by a radial bearing 126 (e.g., a ball bearing) mounted at least partially within the seat member 110. The radial bearing 126 keeps the turbine shaft 124 centered and facilitates its rotation at low friction.

The valve 100 further includes a spring 127, a spring cap 128, a seal carrier 130, and a seal support member 132 disposed within the housing 102. The spring cap 128, the seal carrier 130, and the seal support member 132 are ring-shaped and are mounted to the turbine shaft 124.

The seal carrier 130 and the seal support member 132 are fixedly-disposed within the housing 102 and are configured to support radial seals such as seal 133 and seal 134. The spring cap 128 rests against the seal carrier 130, and is thus also stationary.

A proximal end of the spring 127 rests against the spring cap 128, whereas a distal end of the spring 127 rests against the spool 114. With this configuration, the spring 127 applies a biasing force on the spool 114 in the distal direction toward the seat member 110, such that the spool 114 is seated at the seat 115 when the valve 100 is in the closed state.

The valve 100 further includes a thrust bearing 136 mounted to the turbine shaft 124. The thrust bearing 136 is retained axially between the spring cap 128 and the seal carrier 130. The thrust bearing 136 can be any type of thrust bearings such as a thrust ball bearing, a cylindrical thrust roller bearing, a tapered roller thrust bearing, a spherical roller thrust bearing, a fluid bearing, a magnetic bearing, or a needle bearing.

The thrust bearing 136 facilitates rotation of the turbine shaft 124 with low friction. Particularly, the thrust bearing 136 has a distal race 138 against which an enlarged shaft portion 139 of the turbine shaft 124 rests. The thrust bearing 136 also includes a proximal race 140 that is configured as a cage (e.g., a nylon cage) interfacing with the seal carrier 130. The proximal race 140 is configured as a carrier or retainer for the balls of the thrust bearing 136. With this configuration, as the turbine 122 rotates and the turbine shaft 124 rotates therewith, the thrust bearing 136 supports axial loads to which the turbine 122 is subjected and which are transmitted to the thrust bearing 136 via the enlarged shaft portion 139, while facilitating rotary motion of the turbine 122 at low friction.

The valve 100 further includes an electric generator 142. In an example, the electric generator 142 has a stator and a rotor (not shown). The stator can include wire windings wrapped about a body (e.g., a lamination stack) of the stator. The rotor is positioned within the stator, and the electric generator 142 can include magnets mounted to the rotor in an annular space between the stator and the rotor. The rotor can have a rotor shaft 144 that extends within the valve 100.

The rotor shaft 144 can be coupled to the turbine shaft 124 such that as the turbine shaft 124 rotates, the rotor shaft 144 rotates therewith. As an example, the valve 100 can include a connector 146 configured to couple the rotor shaft 144 to the turbine shaft 124. For instance, the proximal end 147 of the turbine shaft 124 can have a hexagonal exterior surface and the connector 146 can have a corresponding hexagonal interior surface mounted to the hexagonal exterior surface of the proximal end 147 of the turbine shaft 124. This way, as the turbine shaft 124 rotates, the connector 146 rotates therewith. Also, the rotor shaft 144 may be press fitted into the connector 146 such that the connector 146 is coupled to the rotor shaft 144.

In an example, the connector 146 can have a hole 148. A tool can be inserted through the hole 148 to deform the rotor shaft 144 and ensure that the rotor shaft 144 is coupled to the connector 146 such that as the connector 146 rotates with the turbine shaft 124, the rotor shaft 144 (and the rotor of the electric generator 142) rotates therewith.

The valve 100 can further include an adapter 150 that couples the electric generator 142 to the housing 102. For example, the adapter 150 can be cylindrical and hollow. The adapter 150 is threaded to the interior surface of the housing 102 via threads 152. The adapter 150 can have a plurality of screw holes such as screw hole 154, and the electric generator 142 can have a plurality of corresponding screw holes such as screw hole 156. As such, screws can be mounted through the screw holes of the adapter 150 and the respective screw holes of the electric generator 142 to couple the electric generator 142 to the adapter 150, which is coupled to the housing 102 via the threads 152.

The seal carrier 130 and the seal support member 132 abut against a distal end of the adapter 150, which is stationary by virtue of being threaded to the housing 102. This way, the seal carrier 130, the seal support member 132, and the spring cap 128 remain stationary as well.

In an example, the valve 100 can be used as a check valve that allows fluid flow from the first port 116 to the second port 118 while preventing fluid flow from the second port 118 to the first port 116. In this example, the first port 116 can be fluidly coupled to a source of fluid (e.g., a chamber of a hydraulic actuator, an accumulator, a pump, etc.), while the second port 118 may be fluidly coupled to a fluid reservoir.

Particularly, in addition to the closed state shown in FIG. 1, the valve 100 is configured to operate in at least two modes of operation. In a first mode of operation, the valve 100 allows fluid flow from the first port 116 across the turbine 122 then through the main flow cross-holes 119A, 119B of the second port 118. In a second mode of operation, the valve 100 allows a portion of fluid to flow from the first port 116 across the turbine 122 then through the main flow cross-holes 119A, 119B of the second port 118, while also allowing another portion of fluid to bypass the turbine 122 and flow from the first port 116 directly to the second port 118 via the bypass flow cross-holes 120A, 120B.

Fluid at the first port 116 applies a fluid force on the spool 114 in the proximal direction, against the spring 127, which applies a biasing force on the spool 114 in the distal direction. As long as the pressure level of fluid at the first port 116 is not sufficient to overcome the biasing force of the spring 127, the spring 127 keeps the spool 114 seated against the seat member 110 at the seat 115.

As a simplified example, assuming that the spring 127 is a 100 pound per square inch (psi) spring, and assuming that pressure level at the second port 118 is zero psi, then the spool 114 may remain seated as long as pressure level at the first port 116 is below 100 psi. Once the pressure level at the first port 116 reaches 100 psi, the spool 114 may move in the proximal direction.

As the spool 114 moves in the distal direction, the spring 127 is compressed and its biasing force increases. The spool 114 can move in the distal direction to a particular axial position at which force equilibrium between forces acting on the spool 114 is achieved. In the first mode of operation, the spool 114 moves off the seat 115 to allow fluid flow between the spool 114 and the seat member 110. However, the spool 114 keeps blocking the bypass flow cross-holes 120A, 120B.

Figure 4:
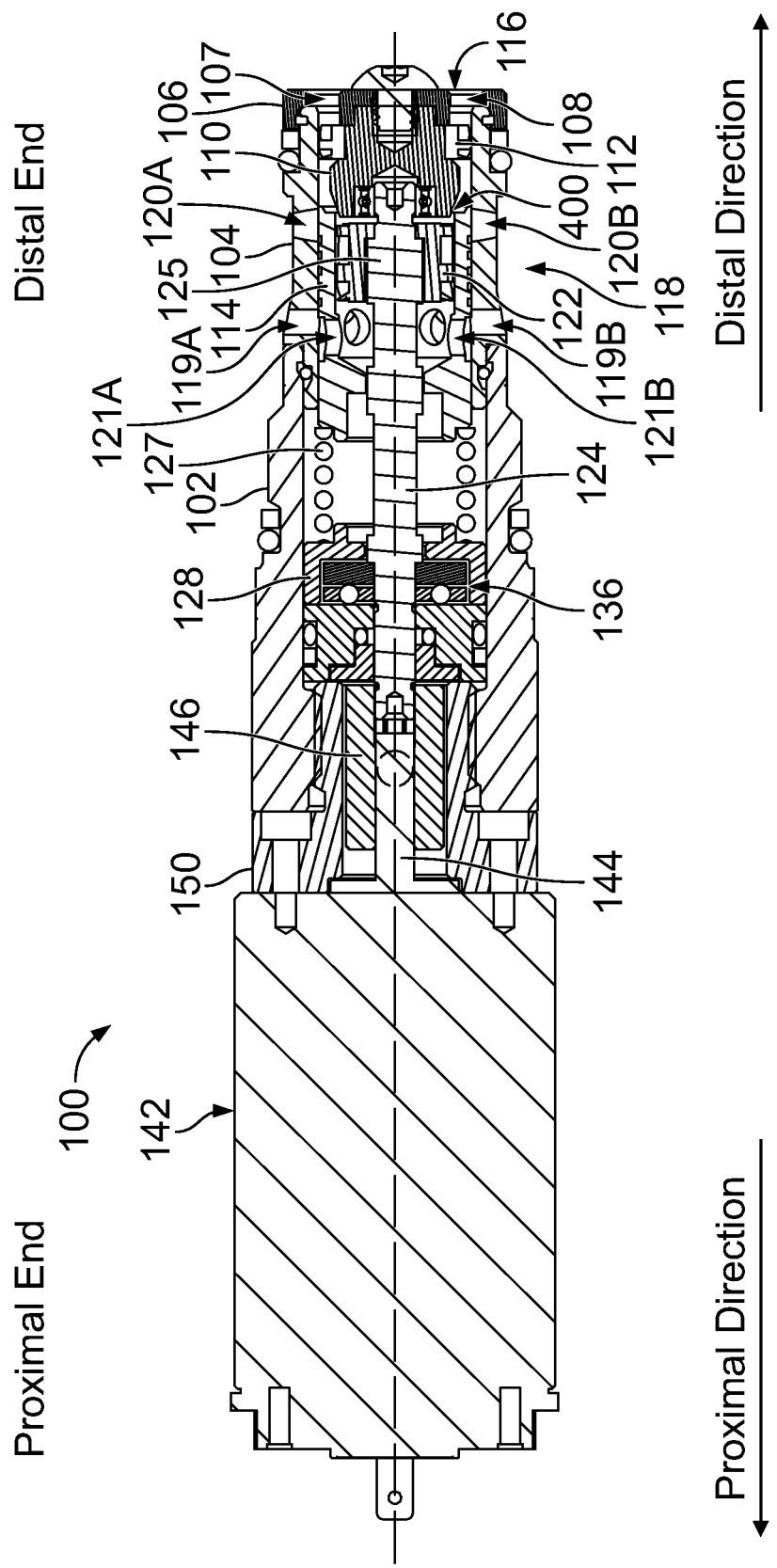
FIG. 4 illustrates a cross-sectional side view of the valve of FIG. 1 operating in a first mode allowing fluid flow from a first port to a second port with fluid flowing through a turbine, in accordance with an example implementation.

FIG. 4 illustrates a cross-sectional side view of the valve 100 operating in a first mode allowing fluid flow from the first port 116 to the second port 118 with fluid flowing through the turbine 122, in accordance with an example implementation. As depicted in FIG. 4, the spool 114 has moved a sufficient axial distance to an axial position at which the distal end of the spool 114 has moved off the seat member 110, thereby forming an annular flow area 400, while the bypass flow cross-holes 120A, 120B remain blocked by the spool 114.

As a result, fluid at the first port 116 is allowed to flow through the through-holes 107, 108 of the nose piece 106, then through the stator 112, which may create a flow vortex or spin and direct a fluid jet through the annular flow area 400 toward the turbine 122. Particularly, the stator 112 may create a flow that has a radial velocity component such that the fluid jet impacts the turbine 122 at an angle to improve efficiency of the turbine 122.

As the spool 114 is unseated off the seat 115 and the annular flow area 400 begins to open to allow fluid flow therethrough, a pressure drop occurs across the annular flow area 400 as the annular flow area 400 operates as an orifice of flow restrictor. In other words, the pressure level upstream of the annular flow area 400 (e.g., at the exit of the stator 112) is higher than the pressure level downstream of the annular flow area 400 at the turbine 122.

Based on Bernoulli's principle, such pressure differential across the annular flow area 400 causes fluid to be accelerated through the annular flow area 400. In other words, fluid velocity increases substantially as it flows through the annular flow area 400. As an example for illustration, if the pressure drop across the annular flow area 400 is 100 psi, the fluid velocity through the annular flow area 400 can reach 15 meters per second. Thus, the fluid discharged from the annular flow area 400 flows downstream, impacting the turbine 122 at such a high velocity.

Thus, even at low fluid flow rates as the spool 114 starts to move off the seat 115, the high fluid velocity impact on the turbine 122 causes the turbine 122 to overcome its inertia and any friction and rotate. Fluid flowing across the turbine 122 can then flow through the spool cross-holes 121A, 121B, then through the main flow cross-holes 119A, 119B of the second port 118.

As fluid flows across the turbine 122, a pressure drop occurs thereacross. The pressure drop across the turbine 122 multiplied by the fluid flow rate through the valve 100 represents power that can be harvested via the electric generator 142.

Particularly, as the turbine 122 rotates, the turbine shaft 124 rotates therewith, thereby causing the rotor shaft 144 of the rotor of the electric generator 142 to rotate. As the rotor along with the magnets coupled thereto rotate within the stator of the electric generator 142, an electric current is generated in the wire windings of the stator (assuming an electric load or resistance is electrically connected with the electric generator 142). Thus, electric power is generated by the electric generator 142 due to fluid passing through the valve 100. In other example implementations, a different type of electric generator might be used, e.g., a generator that does not include magnets.

The electric load connected to the electric generator 142 may be equal to the torque applied to the turbine 122 as fluid passes thereacross. If there is no electric load connected to the electric generator 142, the turbine 122 might rotate freely without torque.

The harvested electric power may be equal to the torque of the turbine 122 multiplied by the rotational speed of the turbine 122 assuming no losses (e.g., friction losses). The harvested power may also be equal to the pressure drop across the turbine 122 multiplied by the fluid flow rate thereacross.

In some applications, the valve 100 may be placed in hydraulic lines of machine where the amount of fluid flow expected might exceed the capacity of the valve 100. When such excessive fluid flow occurs, pressure level at the first port 116 and the pressure drop across the valve 100 increase, which may be undesirable. As such, the valve 100 is configured to have a bypass flow path to divert excessive flow away from the turbine 122 and limit the pressure drop across the valve 100.

Figure 5:
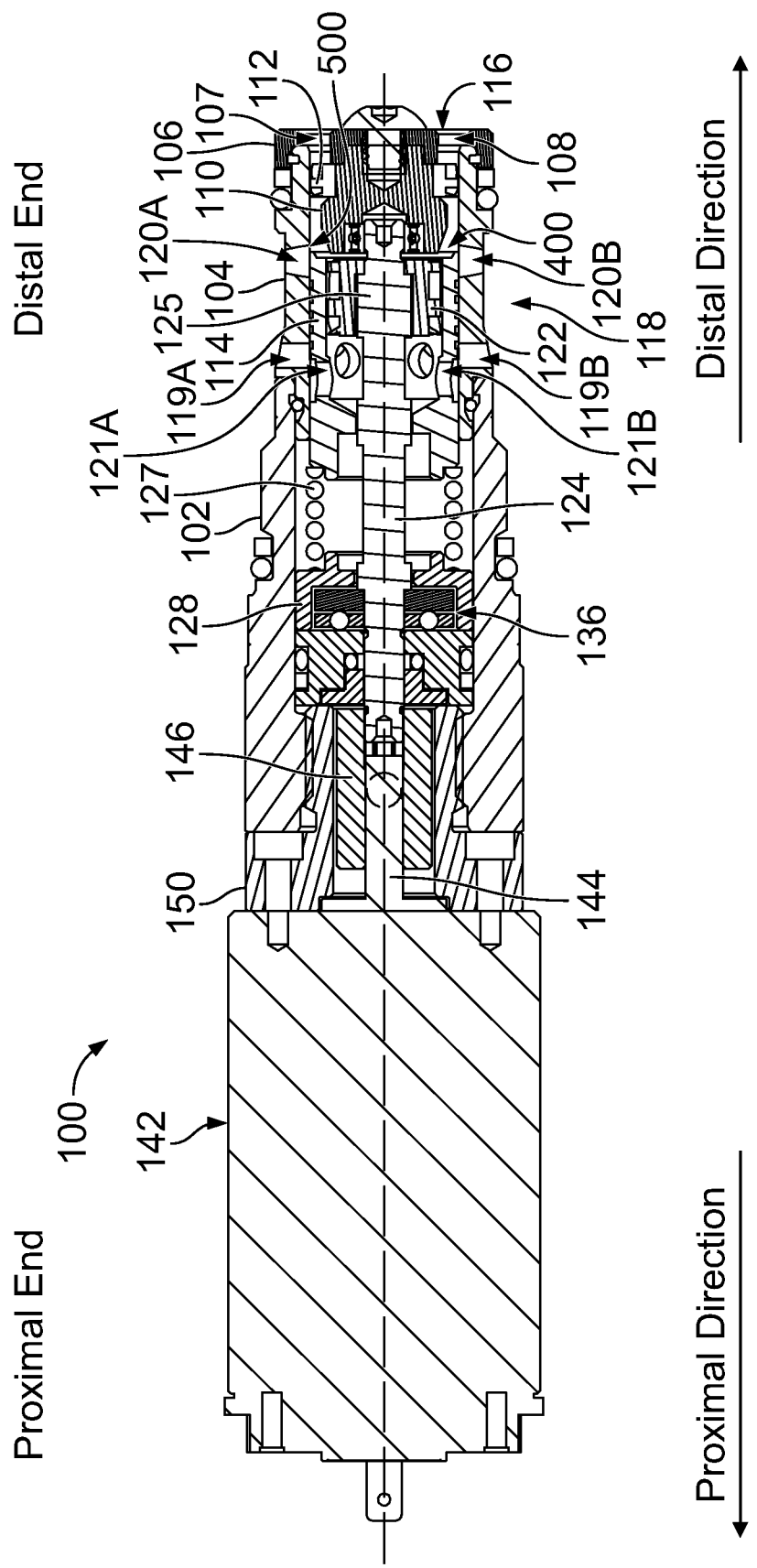
FIG. 5 illustrates a cross-sectional side view of the valve of FIG. 1 operating in a second mode allowing fluid flow from the first port to the second port with a portion of fluid flowing through the turbine and another portion bypassing the turbine, in accordance with an example implementation.

FIG. 5 illustrates a cross-sectional side view of the valve of FIG. 1 operating in a second mode allowing fluid flow from the first port 116 to the second port 118 with a portion of fluid flowing through the turbine 122 and another portion bypassing the turbine 122, in accordance with an example implementation. If excessive fluid flow rates occur at the first port 116, pressure level at the first port 116 may start to increase. As results, the fluid force acting on the spool 114 increases, and can cause the spool 114 to move farther in the proximal direction as shown in FIG. 5 compared to FIG. 4.

At this axial position of the spool 114 shown in FIG. 5, the bypass flow cross-holes 120A, 120B are not blocked by the spool 114. Rather, the bypass flow cross-holes 120A, 120B are exposed and a bypass flow area 500 is formed. Thus, a portion of fluid flows from the first port 116 through the through-holes 107, 108, the stator 112, the annular flow area 400, the turbine 122, the spool cross-holes 121A, 121B, and the main flow cross-holes 119A, 119B of the second port 118, while another portion of fluid flows from the first port 116 through the through-holes 107, 108, the stator 112, the bypass flow area 500, and through the bypass flow cross-holes 120A, 120B of the second port 118. In other words, a portion of fluid flow through the turbine 122, while another portion of fluid bypasses the turbine 122 and flows directly to the second port 118.

As a result of opening such additional bypass flow path directly from the first port 116 to the second port 118, increase in the pressure level at the first port 116 due to excessive flows is limited. Thus, the bypass flow cross-holes 120A, 120B enable the valve 100 to be used in fluid lines of hydraulic machines where a higher flow is expected without causing an undesirably large pressure drop across the valve 100. For example, the pressure drop across the valve 100 can be limited to about 150 psi.

With this configuration, the pressure drop across the turbine 122 is precluded from exceeding a particular level. This way, the turbine 122 and the electric generator 142 are protected against excessive torques and speeds. Further, such configuration of the valve 100 may ensure that a particular range of power can be harvested, thereby facilitating configuring the electric generator to handle such range.

The harvested electric power can be used for several purposes. For example, it can be used to charge a battery of a vehicle (e.g., a construction machine such as a wheel loader or an excavator) in which the valve 100 is used. In another example, the electric power can be used to actuate other components. For instance, it can be used to provide electric signals or power to solenoids of solenoid-operated valves and sensors. This may be particularly beneficial when such valves are disposed far from a source of electric power, and where running wires and cables across long distances can decrease the reliability of the system and increase its complexity. Rather than running wires across long distances, electric power harvested by the valve 100, which may be located proximate a solenoid-operated valve or a sensor, can be used to power the solenoid-operated valve or the sensor. In other examples, if power fails in a machine (e.g., a battery is out of charge), the fluid passing through the valve 100 can generate electric power that powers or actuates other components to put the implements of the machine is a safe state or position.

Figure 6:
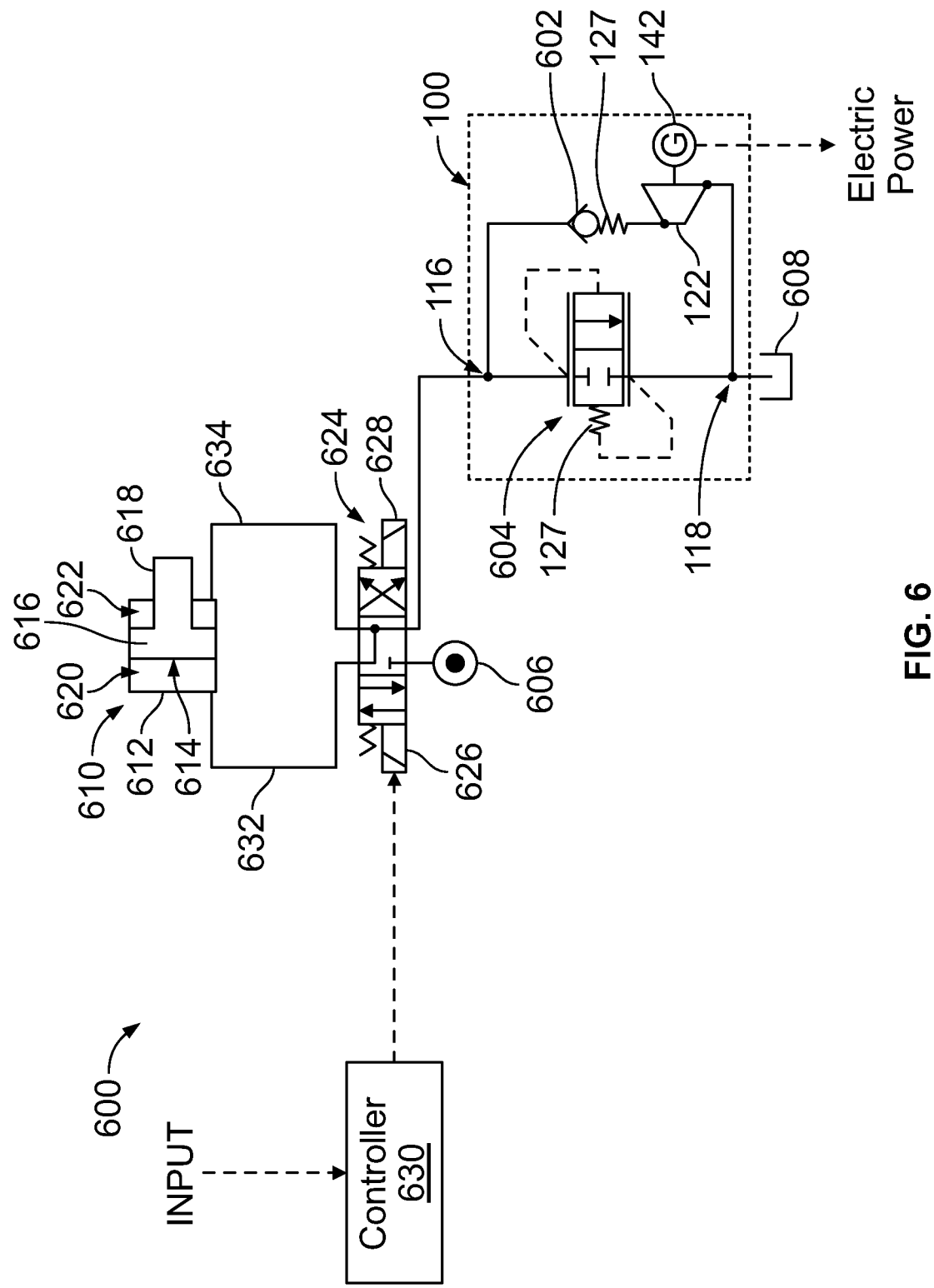
FIG. 6 illustrates a hydraulic system, in accordance with an example implementation.

FIG. 6 illustrates a hydraulic system 600, in accordance with an example implementation. The hydraulic system 600 includes the valve 100 represented symbolically. The main flow path (fluid flow from the first port 116 to the second port 118 via the turbine 122) is represented by spring-loaded check valve 602, and the bypass flow path (direct flow from the first port 116 to the second port 118 without flowing across the turbine 122) is represented by a bypass valve portion 604.

The hydraulic system 600 includes a source 606 of fluid such as a pump, an accumulator, or another portion of the hydraulic system. The hydraulic system 600 also includes a fluid reservoir 608 that can store fluid at a low pressure (e.g., 0-70 psi). The second port 118 of the valve 100 is fluidly-coupled to the fluid reservoir 608.

In the hydraulic system 600 includes a hydraulic actuator 610. The hydraulic actuator 610 includes a cylinder 612 and an actuator piston 614 slidably-accommodated in the cylinder 612. The actuator piston 614 includes a piston head 616 and a piston rod 618 extending from the piston head 616 along a central longitudinal axis direction of the cylinder 612. The piston head 616 divides the inner space of the cylinder 612 into a first chamber 620 and a second chamber 622. A hydraulic cylinder actuator is used herein as an example. Other types of actuators (e.g., hydraulic motors) or other hydraulic consumers can be used.

The hydraulic system 600 includes a directional control valve 624 that directs fluid to and from the hydraulic actuator 610. In an example, the directional control valve 624 can include four ports: an inlet port that is fluidly-coupled to the source 606, a return port that is fluidly-coupled to the first port 116 of the valve 100, a first valve workport that is fluidly-coupled to the first chamber 620 of the hydraulic actuator 610, and a second valve workport that is fluidly-coupled to the second chamber 622.

In an example, the directional control valve 624 can be as spool type valve having a spool that is axially-movable within a bore in a valve body of the directional control valve 624. In this example, the spool can be biased to a neutral position by two springs on opposite sides of the spool as depicted symbolically in FIG. 6. In the example implementation of FIG. 6, in such neutral position, the two valve workports can be fluidly-coupled to the first port 116 of the valve 100. In other examples, the spool may block all ports at the neutral position.

Further, although the directional control valve 624 is shown as a single valve, in other example implementation, the directional control valve 624 can comprise two separate valves, each valve independently controlling fluid flow to a respective chamber of the hydraulic actuator 610. As such, any valve assembly or valve configuration performing the operations of the directional control valve 624 is contemplated herein.

The directional control valve 624 can be electrically-actuated. For instance, the directional control valve 624 can have a first solenoid 626 and a second solenoid 628 that, when energized, move the spool within the directional control valve 624.

The hydraulic system 600 further includes a controller 630. The controller 630 can include one or more processors or microprocessors and may include data storage (e.g., memory, transitory computer-readable medium, non-transitory computer-readable medium, etc.). The data storage may have stored thereon instructions that, when executed by the one or more processors of the controller 630, cause the controller 630 to perform operations described herein. Signal lines to and from the controller 630 are depicted as dashed lines in FIG. 6. A signal line connects the controller 630 to the first solenoid 626; however, a signal line connecting the controller 630 to the second solenoid 628 is not shown to reduce visual clutter in the drawing.

The controller 630 can receive input or input information comprising input commands to operate the hydraulic actuator 610. In response, the controller 630 provides electrical signals to various components of the hydraulic system 600 such as the first solenoid 626, and the second solenoid 628.

For example, the controller 630 can receive a command or input information requesting that the actuator piston 614 be extended (e.g., moved to the right in FIG. 6). In response, the controller 630 actuates the first solenoid 626. This way, fluid is provided from the source 606 to the inlet port of the directional control valve 624, which directs fluid to the first valve workport, then through fluid line 632 to the first chamber 620 to extend the actuator piston 614. Fluid discharged from the second chamber 622 flows through fluid line 634 to the second valve workport of the directional control valve 624, which directs fluid to the return port. Fluid discharged from the return port flows to the first port 116 of the valve 100.

If pressure level at the first port 116 is sufficient to overcome the spring 127, the spool 114 of the valve 100 moves as described above with respect to FIG. 4, and the main flow path open to allow fluid flow through the spring-loaded check valve 602 and the turbine 122, thereby allowing the electric generator 142 to generate electric power to be used in a useful manner in the hydraulic system 600 as described above. (e.g., charging a battery or actuating the first solenoid 626 or the second solenoid 628 or some other electrically-actuated component not shown in the hydraulic system 600). Fluid then flows to the second port 118, then to the fluid reservoir 608.

If the flow rate of fluid discharged from the second chamber 622 exceeds the capacity of the valve 100, pressure level at the first port 116 may increase, causing the spool 114 to move farther as described above with respect to FIG. 5, and the bypass flow path through the bypass valve portion 604 opens (i.e., the spool 114 moves to a position at which the bypass flow cross-holes 120A, 120B are exposed and allow fluid flow therethrough). Such bypass fluid then flows directly to the second port 118.

To retract the actuator piston 614, the controller 630 can send a signal to the second solenoid 628 of the directional control valve 624. This way, fluid from the source 606 can be directed to the second chamber 622, while fluid being discharged from the first chamber 620 is directed through the valve 100, which operates as described above based on the flow rate of fluid discharged from the first chamber 620 and pressure level at the first port 116.

The configuration of the hydraulic system 600 is a simplified example for illustration. Other system configurations, components, types of directional control valves, etc. can be used.

Figure 7:
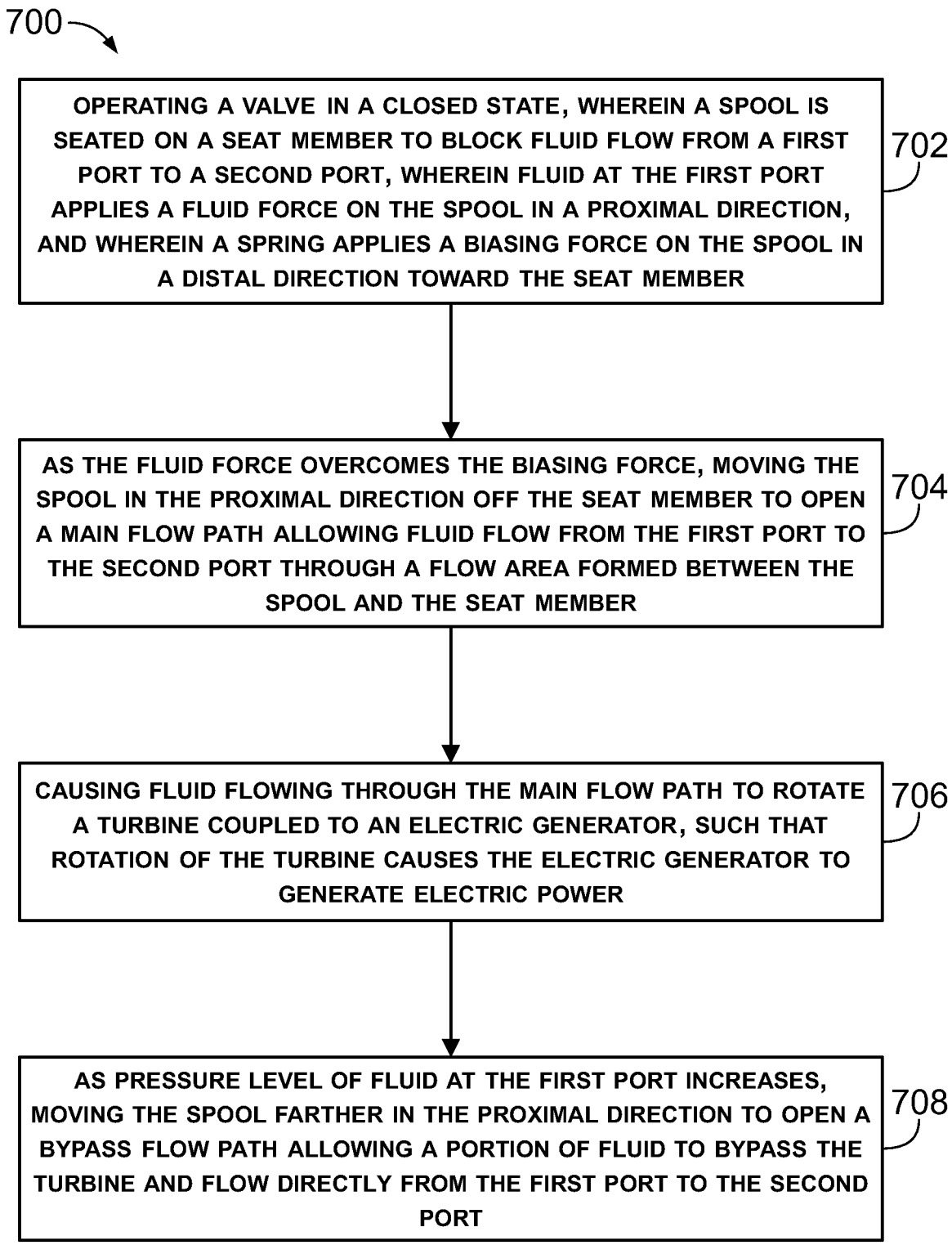
FIG. 7 is a flowchart of a method for operating a valve, in accordance with an example implementation.

FIG. 7 is a flowchart of a method 700 for operating a valve, in accordance with an example implementation. The method 700 can be used for operating the valve 100, for example.

The method 700 may include one or more operations, functions, or actions as illustrated by one or more of blocks 702-708. Although the blocks are illustrated in a sequential order, these blocks may also be performed in parallel, and/or in a different order than those described herein. Also, the various blocks may be combined into fewer blocks, divided into additional blocks, and/or removed based upon the desired implementation. It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 702, the method 700 includes operating the valve 100 in a closed state, wherein the spool 114 is seated on the seat member 110 to block fluid flow from the first port 116 to the second port 118, wherein fluid at the first port 116 applies a fluid force on the spool 114 in a proximal direction, and wherein the spring 127 applies a biasing force on the spool 114 in a distal direction toward the seat member 110.

At block 704, the method 700 includes, as the fluid force overcomes the biasing force, moving the spool 114 in the proximal direction off the seat member 110 to open a main flow path allowing fluid flow from the first port 116 to the second port through a flow area (e.g., the annular flow area 400) formed between the spool 114 and the seat member 110.

At block 706, the method 700 includes causing fluid flowing through the main flow path to rotate the turbine 122 coupled to the electric generator 142, such that rotation of the turbine 122 causes the electric generator 142 to generate electric power.

At block 708, the method 700 includes, as pressure level of fluid at the first port 116 increases, moving the spool 114 farther in the proximal direction to open a bypass flow path allowing a portion of fluid to bypass the turbine 122 and flow directly from the first port 116 to the second port 118.

The method 700 can further include other steps described herein.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" or "about" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

Embodiments of the present disclosure can thus relate to one of the enumerated example embodiments (EEEs) listed below.

EEE 1 is a valve comprising: a seat member; a spool configured to be seated on the seat member to block fluid flow from a first port to a second port when the valve is in a closed state, wherein fluid at the first port applies a fluid force on the spool in a proximal direction; a spring applying a biasing force on the spool in a distal direction toward the seat member, wherein as the fluid force overcomes the biasing force, the spool moves in the proximal direction off the seat member, thereby allowing fluid flow from the first port to the second port through a flow area formed between the spool and the seat member; a turbine configured to rotate as fluid flowing through the flow area flows downstream across the turbine, wherein the turbine is mounted to a turbine shaft configured to rotate with the turbine; and an electric generator coupled to the turbine shaft, such that rotation of the turbine shaft with the turbine causes the electric generator to generate electric power.

EEE 2 is the valve of EEE 1, wherein as pressure level of fluid at the first port increases, the spool moves farther in the proximal direction, thereby allowing a first portion of fluid to flow through the flow area and the turbine, while allowing a second portion of fluid to flow directly from the first port to the second port, bypassing the turbine.

EEE 3 is the valve of EEE 2, further comprising: a sleeve having a longitudinal cylindrical cavity in which the spool is disposed and is axially-movable, wherein the second port comprises a first set of main flow cross-holes formed in the sleeve and a second set of bypass flow cross-holes formed in the sleeve, wherein the first portion of fluid flowing through turbine flows to the second port via the first set of main flow cross-holes, and wherein the second portion of fluid bypassing the turbine flows to the second port via the second set of bypass flow cross-holes.

EEE 4 is the valve of EEE 3, further comprising: a nose piece coupled to a distal end of the sleeve, wherein the first port comprises a plurality of through-holes formed in the nose piece, and wherein the seat member is coupled to the nose piece.

EEE 5 is the valve of any of EEEs 3-4, wherein the spool comprises a plurality of spool cross-holes, and wherein first portion of fluid flowing through the turbine flows through the plurality of spool cross-holes, then through the first set of main flow cross-holes of the sleeve.

EEE 6 is the valve of any of EEEs 1-5, further comprising: a stator disposed upstream of the turbine and the flow area, wherein the stator is configured to direct fluid to impact the turbine at an angle.

EEE 7 is the valve of any of EEEs 1-6, further comprising: a radial bearing mounted to the turbine shaft at least partially within the seat member, wherein the radial bearing is configured to support the turbine shaft within the seat member.

EEE 8 is the valve of any of EEEs 1-7, further comprising: a thrust bearing supporting the turbine shaft against axial loads and facilitating rotation of the turbine shaft with the turbine.

EEE 9 is the valve of any of EEEs 1-8, wherein the electric generator comprises a rotor shaft coupled to the turbine shaft, such that rotation of the turbine shaft causes the rotor shaft of the electric generator to rotate therewith.

EEE 10 is the valve of EEE 9, further comprising: a connector that couples the turbine shaft to the rotor shaft, wherein rotation of the turbine shaft causes the connector to rotate, thereby causing the rotor shaft to rotate therewith.

EEE 11 is the valve of any of EEEs 1-10, further comprising: a housing; and an adapter coupled to the housing, wherein the electric generator is coupled to the adapter.

EEE 12 is a hydraulic system comprising: a hydraulic actuator having a first chamber and a second chamber; a source of fluid; a fluid reservoir; a directional control valve having an inlet port fluidly-coupled to the source of fluid, a first workport fluidly-coupled to the first chamber of the hydraulic actuator, a second workport fluidly-coupled to the second chamber of the hydraulic actuator, and a return port; and a valve comprising: a first port that is fluidly-coupled to the return port of the directional control valve and a second port that is fluidly-coupled to the fluid reservoir, a seat member, a spool configured to be seated on the seat member to block fluid flow from the first port to the second port when the valve is in a closed state, wherein fluid at the first port applies a fluid force on the spool in a proximal direction, a spring applying a biasing force on the spool in a distal direction toward the seat member, wherein as the fluid force overcomes the biasing force, the spool moves in the proximal direction off the seat member, thereby allowing fluid flow from the first port to the second port through a flow area formed between the spool and the seat member, a turbine configured to rotate as fluid flowing through the flow area flows downstream across the turbine, wherein the turbine is mounted to a turbine shaft configured to rotate with the turbine, and an electric generator coupled to the turbine shaft, such that rotation of the turbine shaft with the turbine causes the electric generator to generate electric power as fluid discharged from return port flows to the fluid reservoir via the valve.

EEE 13 is the hydraulic system of EEE 12, wherein as pressure level of fluid at the first port increases, the spool moves farther in the proximal direction, thereby allowing a first portion of fluid to flow through the flow area and the turbine, while allowing a second portion of fluid to flow directly from the first port to the second port, bypassing the turbine.

EEE 14 is the hydraulic system of EEE 13, wherein the valve further comprises: a sleeve having a longitudinal cylindrical cavity in which the spool is disposed and is axially-movable, wherein the second port comprises a first set of main flow cross-holes formed in the sleeve and a second set of bypass flow cross-holes formed in the sleeve, wherein the first portion of fluid flowing through turbine flows to the second port via the first set of main flow cross-holes, and wherein the second portion of fluid bypassing the turbine flows to the second port via the second set of bypass flow cross-holes.

EEE 15 is the hydraulic system of any of EEEs 12-14, wherein the valve further comprises: a stator disposed upstream of the turbine and the flow area, wherein the stator is configured to direct fluid to impact the turbine at an angle.

EEE 16 is the hydraulic system of any of EEEs 12-15, wherein the valve further comprises: a radial bearing mounted to the turbine shaft at least partially within the seat member, wherein the radial bearing is configured to support the turbine shaft within the seat member; and a thrust bearing supporting the turbine shaft against axial loads and facilitating rotation of the turbine shaft with the turbine.

EEE 17 is the hydraulic system of any of EEEs 12-16, wherein the electric generator comprises a rotor shaft coupled to the turbine shaft, such that rotation of the turbine shaft causes the rotor shaft of the electric generator to rotate therewith, wherein the valve further comprises: a connector that couples the turbine shaft to the rotor shaft, wherein rotation of the turbine shaft causes the connector to rotate, thereby causing the rotor shaft to rotate therewith.

EEE 18 is the hydraulic system of any of EEEs 12-17, wherein the valve further comprises: a housing; and an adapter coupled to the housing, wherein the electric generator is coupled to the adapter.

EEE 19 is a method comprising: operating a valve in a closed state, wherein a spool is seated on a seat member to block fluid flow from a first port to a second port, wherein fluid at the first port applies a fluid force on the spool in a proximal direction, and wherein a spring applies a biasing force on the spool in a distal direction toward the seat member; as the fluid force overcomes the biasing force, moving the spool in the proximal direction off the seat member to open a main flow path allowing fluid flow from the first port to the second port through a flow area formed between the spool and the seat member; causing fluid flowing through the main flow path to rotate a turbine coupled to an electric generator, such that rotation of the turbine causes the electric generator to generate electric power; and as pressure level of fluid at the first port increases, moving the spool farther in the proximal direction to open a bypass flow path allowing a portion of fluid to bypass the turbine and flow directly from the first port to the second port.

EEE 20 is the method of EEE 19, wherein the valve comprises a sleeve having a longitudinal cylindrical cavity in which the spool is disposed and is axially-movable, wherein the second port comprises a first set of main flow cross-holes and a second set of bypass flow cross-holes formed in the sleeve, wherein: allowing fluid flow from the first port to the second port via the main flow path comprises allowing fluid to flow to the second port via the first set of main flow cross-holes, and allowing the portion of fluid to flow through the bypass flow path directly from the first port to the second port comprises allowing fluid to flow to the second port via the second set of bypass flow cross-holes.

What is claimed is:
1. A valve comprising:
a seat member;
a spool configured to be seated on the seat member to block fluid flow from a first port to a second port when the valve is in a closed state, wherein fluid at the first port applies a fluid force on the spool in a proximal direction;
a spring applying a biasing force on the spool in a distal direction toward the seat member, wherein as the fluid force overcomes the biasing force, the spool moves in the proximal direction off the seat member, thereby allowing fluid flow from the first port to the second port through a flow area formed between the spool and the seat member;
a turbine configured to rotate as fluid flowing through the flow area flows downstream across the turbine, wherein the turbine is mounted to a turbine shaft configured to rotate with the turbine;
a stator disposed upstream of the turbine and the flow area, wherein the stator is configured to direct fluid to impact the turbine at an angle; and
an electric generator coupled to the turbine shaft, such that rotation of the turbine shaft with the turbine causes the electric generator to generate electric power.

2. The valve of claim 1, wherein as pressure level of fluid at the first port increases, the spool moves farther in the proximal direction, thereby allowing a first portion of fluid to flow through the flow area and the turbine, while allowing a second portion of fluid to flow directly from the first port to the second port, bypassing the turbine.

3. The valve of claim 2, further comprising:
a sleeve having a longitudinal cylindrical cavity in which the spool is disposed and is axially-movable, wherein the second port comprises a first set of main flow cross-holes formed in the sleeve and a second set of bypass flow cross-holes formed in the sleeve, wherein the first portion of fluid flowing through turbine flows to the second port via the first set of main flow cross-holes, and wherein the second portion of fluid bypassing the turbine flows to the second port via the second set of bypass flow cross-holes.

4. The valve of claim 3, further comprising:
a nose piece coupled to a distal end of the sleeve, wherein the first port comprises a plurality of through-holes formed in the nose piece, and wherein the seat member is coupled to the nose piece.

5. The valve of claim 3, wherein the spool comprises a plurality of spool cross-holes, and wherein the first portion of fluid flowing through the turbine flows through the plurality of spool cross-holes, then through the first set of main flow cross-holes of the sleeve.

6. A valve comprising:
a seat member;
a spool configured to be seated on the seat member to block fluid flow from a first port to a second port when the valve is in a closed state, wherein fluid at the first port applies a fluid force on the spool in a proximal direction;
a spring applying a biasing force on the spool in a distal direction toward the seat member, wherein as the fluid force overcomes the biasing force, the spool moves in the proximal direction off the seat member, thereby allowing fluid flow from the first port to the second port through a flow area formed between the spool and the seat member;
a turbine configured to rotate as fluid flowing through the flow area flows downstream across the turbine, wherein the turbine is mounted to a turbine shaft configured to rotate with the turbine;
a radial bearing mounted to the turbine shaft at least partially within the seat member, wherein the radial bearing is configured to support the turbine shaft within the seat member; and
an electric generator coupled to the turbine shaft, such that rotation of the turbine shaft with the turbine causes the electric generator to generate electric power.

7. A valve comprising:
a seat member;
a spool configured to be seated on the seat member to block fluid flow from a first port to a second port when the valve is in a closed state, wherein fluid at the first port applies a fluid force on the spool in a proximal direction;
a spring applying a biasing force on the spool in a distal direction toward the seat member, wherein as the fluid force overcomes the biasing force, the spool moves in the proximal direction off the seat member, thereby allowing fluid flow from the first port to the second port through a flow area formed between the spool and the seat member;
a turbine configured to rotate as fluid flowing through the flow area flows downstream across the turbine, wherein the turbine is mounted to a turbine shaft configured to rotate with the turbine;
a thrust bearing supporting the turbine shaft against axial loads and facilitating rotation of the turbine shaft with the turbine; and
an electric generator coupled to the turbine shaft, such that rotation of the turbine shaft with the turbine causes the electric generator to generate electric power.

8. The valve of claim 1, wherein the electric generator comprises a rotor shaft coupled to the turbine shaft, such that rotation of the turbine shaft causes the rotor shaft of the electric generator to rotate therewith.

9. The valve of claim 8, further comprising:
a connector that couples the turbine shaft to the rotor shaft, wherein rotation of the turbine shaft causes the connector to rotate, thereby causing the rotor shaft to rotate therewith.

10. The valve of claim 1, further comprising:
a housing; and
an adapter coupled to the housing, wherein the electric generator is coupled to the adapter.

11. A hydraulic system comprising:
a hydraulic actuator having a first chamber and a second chamber;
a source of fluid;
a fluid reservoir;
a directional control valve having an inlet port fluidly-coupled to the source of fluid, a first workport fluidly-coupled to the first chamber of the hydraulic actuator, a second workport fluidly-coupled to the second chamber of the hydraulic actuator, and a return port; and
a valve comprising:
a first port that is fluidly-coupled to the return port of the directional control valve and a second port that is fluidly-coupled to the fluid reservoir,
a seat member,
a spool configured to be seated on the seat member to block fluid flow from the first port to the second port when the valve is in a closed state, wherein fluid at the first port applies a fluid force on the spool in a proximal direction,
a spring applying a biasing force on the spool in a distal direction toward the seat member, wherein as the fluid force overcomes the biasing force, the spool moves in the proximal direction off the seat member, thereby allowing fluid flow from the first port to the second port through a flow area formed between the spool and the seat member,
a turbine configured to rotate as fluid flowing through the flow area flows downstream across the turbine, wherein the turbine is mounted to a turbine shaft configured to rotate with the turbine, and an electric generator coupled to the turbine shaft, such that rotation of the turbine shaft with the turbine causes the electric generator to generate electric power as fluid discharged from return port flows to the fluid reservoir via the valve.

12. The hydraulic system of claim 11, wherein as pressure level of fluid at the first port increases, the spool moves farther in the proximal direction, thereby allowing a first portion of fluid to flow through the flow area and the turbine, while allowing a second portion of fluid to flow directly from the first port to the second port, bypassing the turbine.

13. The hydraulic system of claim 12, wherein the valve further comprises:

a sleeve having a longitudinal cylindrical cavity in which the spool is disposed and is axially-movable, wherein the second port comprises a first set of main flow cross-holes formed in the sleeve and a second set of bypass flow cross-holes formed in the sleeve, wherein the first portion of fluid flowing through turbine flows to the second port via the first set of main flow cross-holes, and wherein the second portion of fluid bypassing the turbine flows to the second port via the second set of bypass flow cross-holes.

14. The hydraulic system of claim 11, wherein the valve further comprises:

a stator disposed upstream of the turbine and the flow area, wherein the stator is configured to direct fluid to impact the turbine at an angle.

15. The hydraulic system of claim 11, wherein the valve further comprises:

a radial bearing mounted to the turbine shaft at least partially within the seat member, wherein the radial bearing is configured to support the turbine shaft within the seat member; and a thrust bearing supporting the turbine shaft against axial loads and facilitating rotation of the turbine shaft with the turbine.

16. The hydraulic system of claim 11, wherein the electric generator comprises a rotor shaft coupled to the turbine shaft, such that rotation of the turbine shaft causes the rotor shaft of the electric generator to rotate therewith, wherein the valve further comprises:

a connector that couples the turbine shaft to the rotor shaft, wherein rotation of the turbine shaft causes the connector to rotate, thereby causing the rotor shaft to rotate therewith.

17. The hydraulic system of claim 11, wherein the valve further comprises:

a housing; and an adapter coupled to the housing, wherein the electric generator is coupled to the adapter.

18. A method comprising:

operating a valve in a closed state, wherein a spool is seated on a seat member to block fluid flow from a first port to a second port, wherein fluid at the first port applies a fluid force on the spool in a proximal direction, and wherein a spring applies a biasing force on the spool in a distal direction toward the seat member;

as the fluid force overcomes the biasing force, moving the spool in the proximal direction off the seat member to open a main flow path allowing fluid flow from the first port to the second port through a flow area formed between the spool and the seat member;

causing fluid flowing through the main flow path to rotate a turbine coupled to an electric generator, such that rotation of the turbine causes the electric generator to generate electric power; and as pressure level of fluid at the first port increases, moving the spool farther in the proximal direction to open a bypass flow path allowing a portion of fluid to bypass the turbine and flow directly from the first port to the second port.

19. The method of claim 18, wherein the valve comprises a sleeve having a longitudinal cylindrical cavity in which the spool is disposed and is axially-movable, wherein the second port comprises a first set of main flow cross-holes and a second set of bypass flow cross-holes formed in the sleeve, wherein:

allowing fluid flow from the first port to the second port via the main flow path comprises allowing fluid to flow to the second port via the first set of main flow cross-holes, and allowing the portion of fluid to flow through the bypass flow path directly from the first port to the second port comprises allowing fluid to flow to the second port via the second set of bypass flow cross-holes.

* * * * *